(12) United States Patent
Peterson et al.

(10) Patent No.: US 7,647,274 B2
(45) Date of Patent: *Jan. 12, 2010

(54) SYSTEM AND METHOD FOR MATCHING LOAN CONSUMERS AND LENDERS

(75) Inventors: Dale Lowell Peterson, Keller, TX (US); Gregory Todd Thibodeau, Roanoke, TX (US); John South, Grapevine, TX (US)

(73) Assignee: Horizon Digital Finance, LLC, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/648,514

(22) Filed: Dec. 29, 2006

(65) Prior Publication Data

US 2007/0168278 A1 Jul. 19, 2007

Related U.S. Application Data

(63) Continuation-in-part of application No. 10/783,322, filed on Feb. 20, 2004.

(51) Int. Cl.
*G06Q 40/00* (2006.01)
(52) U.S. Cl. ........................................ 705/38
(58) Field of Classification Search .............. 705/38
See application file for complete search history.

(56) References Cited

U.S. PATENT DOCUMENTS

| 6,324,524 | B1 * | 11/2001 | Lent et al. ............... 705/38 |
|---|---|---|---|
| 6,385,594 | B1 * | 5/2002 | Lebda et al. ............ 705/38 |
| 6,622,131 | B1 * | 9/2003 | Brown et al. ............ 705/38 |
| 6,920,434 | B1 * | 7/2005 | Cossette ................. 705/38 |
| 2003/0036993 | A1 * | 2/2003 | Parthasarathy ......... 705/38 |
| 2003/0208412 | A1 * | 11/2003 | Hillestad et al. ......... 705/26 |
| 2003/0217034 | A1 * | 11/2003 | Shutt ....................... 707/1 |
| 2003/0229582 | A1 * | 12/2003 | Sherman et al. ......... 705/38 |
| 2004/0128262 | A1 * | 7/2004 | Nafousi .................. 705/400 |
| 2006/0126101 | A1 * | 6/2006 | Shutt et al. ............ 358/1.15 |
| 2007/0299769 | A1 * | 12/2007 | Fowler et al. ........... 705/38 |

OTHER PUBLICATIONS

"LendingTree Eliminates Need for Manual Loan Approvals Online Loan Marketplace Becomes First to Offer Real-Time Approvals from Multiple Lenders." Business Editors. Business Wire. New York: May 12, 1999, p. 1.*

* cited by examiner

*Primary Examiner*—Susanna M Diaz
(74) *Attorney, Agent, or Firm*—McDonnell Boehnen Hulbert & Berghoff LLP

(57) ABSTRACT

A system and method for matching a loan consumer with lenders via the Internet includes receiving loan consumer application information. The application information is stored in a database. An internally specified filter is applied to the information to determine if the loan consumer meets a set of loan criteria. A subset of the information is submitted to a credit bureau. A credit report is generated based on the subset of information. A lender database is searched to match the customer information and credit report to ranked lenders. A query is transmitted to one of the lenders. A response is generated and received based on the query. Subsequent query and response steps are repeated only after receipt of the previous response, until all lenders have been queried. Only lenders who responded with an approval are presented for review by the customer.

8 Claims, 2 Drawing Sheets

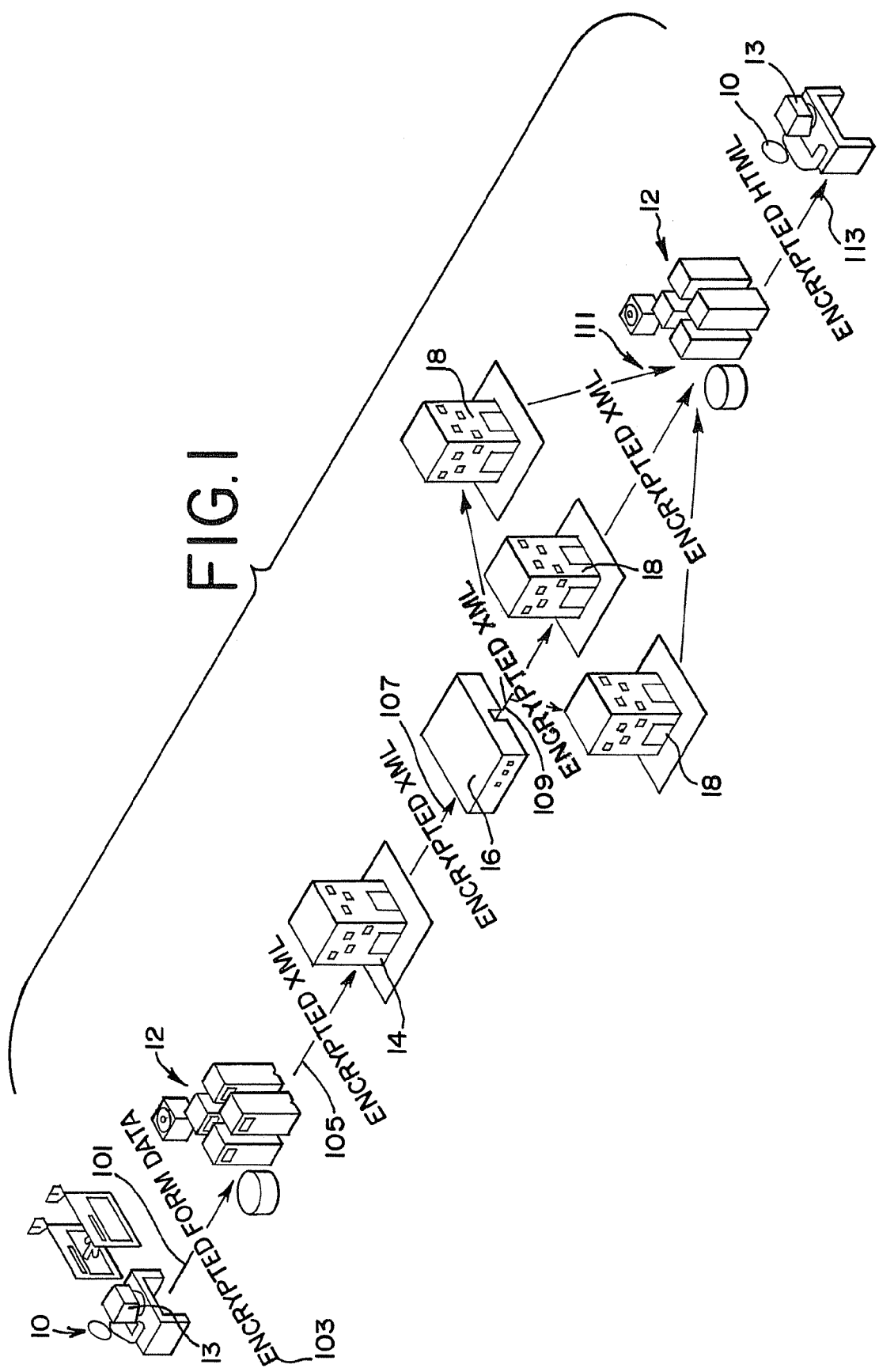

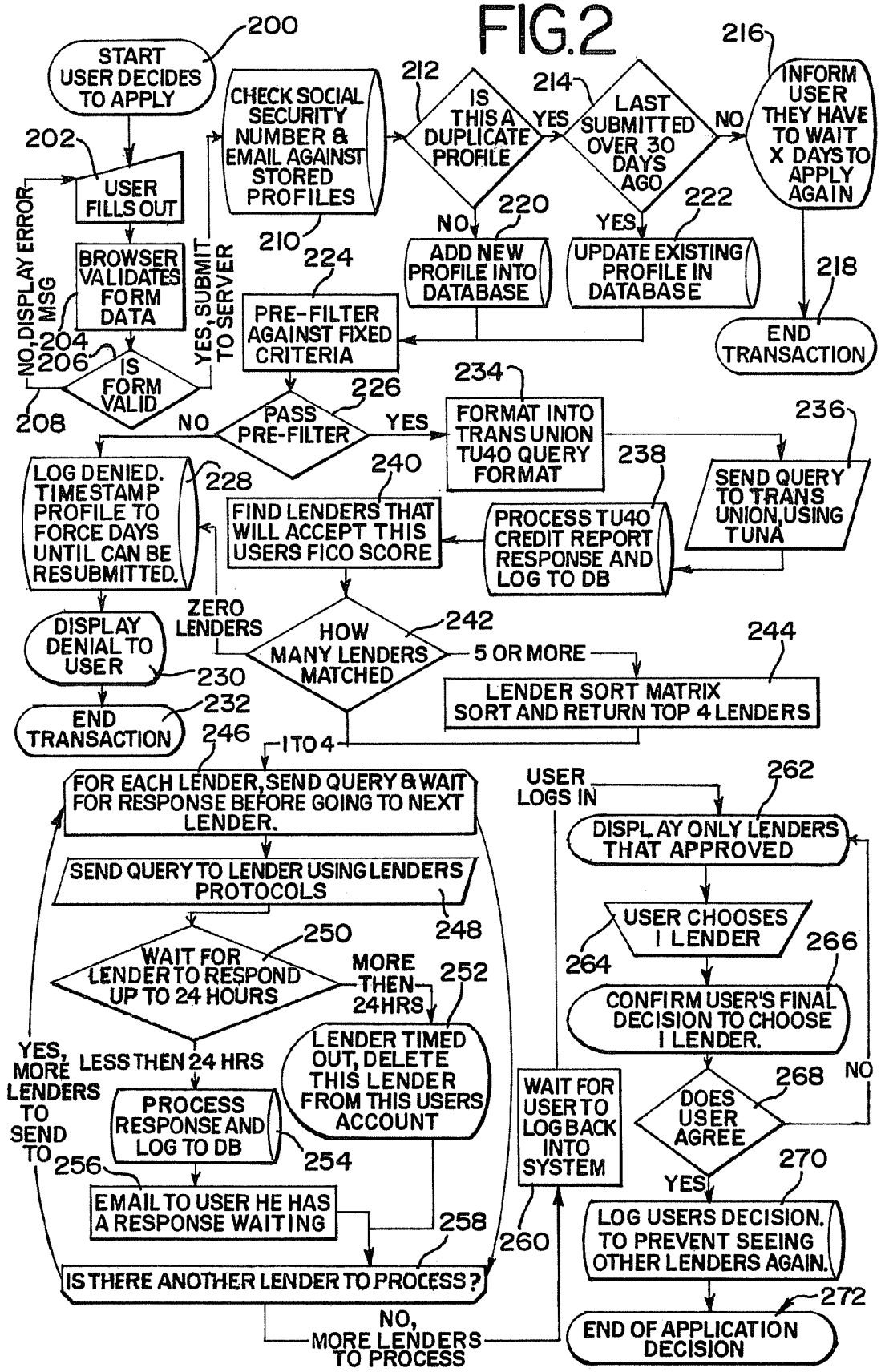

SYSTEM AND METHOD FOR MATCHING LOAN CONSUMERS AND LENDERS

This is a continuation-in-part application of U.S. patent application Ser. No. 10/783,322, filed Feb. 20, 2004.

FIELD OF THE INVENTION

This invention relates generally to the field of securing a loan. In particular, the present invention relates to a system for matching loan consumers and lenders, and methods for permitting loan consumers to apply for loans, and generating and presenting a set of qualified lenders and their loan offers to the loan consumer.

BACKGROUND OF THE INVENTION

The purchase and financing of an expensive item or items can be an intimidating process. One of the most stressful and often frustrating parts of the process is the search for and securing of financing, whether the item is a house, car or other item. Often these financial transactions are made difficult by the amount and nature of the research needed to obtain a fair loan at market interest rates and the often impersonal or even unpleasant interactions encountered during and after the search. Even before the loan process begins, the actual negotiations regarding the purchase, and other associated transactions can predispose the purchaser to assume a negative attitude during other aspects of completing the financial portion of the purchase.

The loan consumer often feels helpless and not in control of the loan procurement process. The sometimes hurried, hard-sell pitch of loan officers leaves the consumer suspicious and wary and wishing that there were more choices and information available. The consumer may desire that loan particulars were in a format which is easy to understand and useful when comparing competing loan institutions.

Other disadvantages can occur when a loan consumer uses one of the existing e-mail, "on-line" or internet loan services. For example, existing internet loan services may be structured to provide a large amount of information regarding loans for which the consumer is qualified. The information is presented to the consumer at one time and can include a staggering amount of options. The number of options can contribute to the feeling of confusion and frustration and the impersonal approach rendered by this type of service. It is left up to the consumer to compare options and attempt to ferret out the most advantageous loan. While some consumers may be competent to do so and therefore comfortable with this approach, the amount of data can still appear bewildering and requires unnecessary labor on the part of the consumer. Furthermore, excessive communication from prospective lenders contributes to a negative experience for a prospective consumer.

Accordingly, there is a demand for a method and apparatus which simplifies and streamlines the process of loan procurement by matching loan consumers to a defined set of qualified lenders and their loan offers, while permitting the consumer to retain control of the selection process. The present invention satisfies this demand.

SUMMARY OF THE INVENTION

One aspect of an embodiment of the present invention includes a method of matching a loan consumer with lenders via the Internet including receiving loan consumer application information. The application information is stored in a database. An internally specified filter is applied to the application information to determine if the loan consumer meets a first set of loan criteria. The criteria of the internally specified filter is determined by collecting and assembling criteria from one or more of publicly available information, historical lender loan decisions, and market experience. It should be noted that the information used to set the internally specialized filter criteria is not obtained from the lender. It is believed that this process, whereby filter criteria is not solicited or obtained from lenders, functions to maintain a measure of objectivity in the process and thus may provide unique benefits to the loan consumer. A subset of the application information is submitted to a credit bureau. A credit report is received based on the submitting of the subset of application information. A lender database is searched to match the loan customer application information and credit report to the lenders participating in the program. Using a Customer Satisfaction Index score (CSI score) all of the selected matching lenders are staged in rank order best CSI score to lowest CSI score. The system then selects only the four lenders that best matched the customer application information, credit report information and CSI score. A query is transmitted to the best matched one of the no more than four lenders. A response is generated and received based on the query. The response may be presented real-time to the customer, both online within the company's web site and via an email transmitted to the customers email address. Only lenders who respond with an approval to the loan customer are presented for review by the loan customer. A loan customer decision is stored based on the presentation of the decision.

The pre-filtering steps will include an evaluation and analysis process along with CSI score to be described below in more detail. Generally, the evaluation and analysis process includes reviewing the loan customer application information to determine if the customer meets predetermined application criteria. For purposes of the present application, the Credit Report will include a full credit report, with historical and current loan and financial and other information of the loan customer, a credit score and a fraud report to detect any fraud or other inconsistencies in the application information. The lender database is not a publicly available database, but rather, is collected, evaluated and ranked by the system of the present invention and stored as a proprietary feature usable by the system.

It will be understood, that while not considered a critical aspect of the present system and method a number of loan and auto-related or ancillary features will preferably be offered on the website. Many of these features are directed to enabling the applicant to perform detailed research related to loans and automobiles. Accordingly, at the onset of the process, a customer may browse the website for a number of useful features and links.

A first section of the initial site may include a "Research" section. The tools section includes hyperlinks ("links") to permit the customer to research new and used auto prices, values for new and used automobiles, side-by-side comparisons, rebates and incentives, and vehicle reviews. A second section of the research page may include hyperlinks to auto history reports, crash test results, and recall notices. A third section of the tools section may include a "refer a friend" link for notifying others about the services of the website. A "products and services" section may include auto insurance price quotes, service contract price quotes and roadside assistance price quotes. In addition, the tools section may includes an "Offers" section including links to free and other offers such as a free lemon check, a free credit report and free motor club memberships.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF THE DRAWINGS

FIG. 1 is a diagrammatic representation of an embodiment of a system according to the present invention, and FIG. 2 is a flowchart of an embodiment of a method according to the present invention.

DETAILED DESCRIPTION OF THE PRESENTLY PREFERRED EMBODIMENTS

In broad overview, the invention is a method and computer system for matching loan customers with loans and those lending institutions that provide those loans. While the method and system may be used by a loan consumer for applying to a plurality of loan institutions for any type of loan, it is particularly suited to automotive loan applications.

It will be understood that for the purposes of the present application the terms "consumer", "customer", "loan consumer" and "applicant" may be used interchangeably, and refers to an individual or party desiring to obtain a loan or vehicular loan through the system and method of the present invention. In a similar fashion, the terms "lender", "lending institution" and "loan provider" refer to any party providing loans to loan consumers through the system and method of the present invention.

FIG. 1 shows a simplified outline of a system and method of matching loan consumers and loan institutions according to the present invention. The simplified process begins (step 101) when a loan consumer 10, which may be or which may include a representative thereof, accesses the system website and completes an online loan application presented by a system server 12. The loan consumer 10 may access the system 12 through a standard computer terminal 13 having Internet access or any equivalent for accessing the server of system 12.

The completed loan application includes information from the loan consumer 10 necessary for the application process. The consumer loan application information is input into the system 12 via website enabled data entry and is preferably encrypted (step 103). Preferably, the encryption is a GeoSite licensed 128 bit server certificate and communication is by standard HTTPS and SSL (Hypertext Transfer Protocol over Secure Socket Layer). The system 12 receives the encrypted application information and is checked to determine if complete and free of defects. The application information is converted into a convenient format such as XML (a markup language for structured information exchange). The application information is organized and stored in a central database (DB) of the system 12. A subset of the application information is submitted to a credit bureau 14 (step 105) (via a SSL certificate provided by the credit bureau to encrypt all data transfers) for generation of a report regarding the loan consumer's financial status for assessing the risk of granting a loan. Again, the subset is preferably sent via encrypted XML or an equivalent. The credit bureau 14 scores the consumer application information and returns a credit score to the system 12. The system 12 processes the consumer application information and the credit score with a logic-engine 16 (of system 12), to match the loan consumer 10 to loan providers 18 (step 107). A loan data-set is generated based on the loan consumer application information and the credit score and sent, preferably by encrypted XML, to each of a plurality of lenders 18 (step 109). Each lender 18 processes the data-set and returns an answer, preferably by encrypted XML, to the system 12 (step 111). The system 12 enters the answer from each lender 18 into a database and presents the loan consumer 10 with a ranked set of lender 18 choices (step 113) (HTTPS and SSL with return data using the GeoSite licensed 128 bit server certificate).

Referring again to FIG. 1, the system 12 of the present invention according to one example includes a conventional web server, such as for example a Compaq server with a dual Intel Pentium III processor, each running at 500 MHz. The server includes 512 mb of ram memory. Data storage is accomplished by a hard disk system of the server including a raid array of 18 gb disk drives. The web server, application server and database server may be run on a single server or, in the alternate, the various applications may be split among separate servers to allow increased system performance and/or security as is known in the art. Furthermore, the server preferably employs database software products such as MySQL® for database design and support and website development and support applications such as asp.net and vb.net. The server 12 is connected to the Internet so as to receive and transmit information to and from a plurality of loan consumers, credit bureaus and lenders as well as other websites and resources. It will be understood that a wide variety of hardware systems and software could be used to execute the necessary operations and so on required by methods of the invention.

Referring to both FIGS. 1 and 2, with respect to the operation of the system 12, a loan consumer 10 may begin the loan application process by visiting a specific URL (website) via the Internet or an equivalent system (where the functionality of the present invention resides) and selecting (by clicking a button on the website or the equivalent) an "Apply" button 200, thus initiating the application process. The consumer 10 is presented with a "Getting Started Page". The consumer 10 completes and submits the Getting Started Page and selects a form type, "Purchase," "Refinance," "Private Party." "Lease Buyout," and/or "Lease," and "Individual," or "Joint". The Getting Started Page includes information related to security and privacy measures as well as future customer access to the system "My Account Page" where loan offer decisions are displayed along with customer application data. The Getting Started Page allows customers to set us a User Name (e.g., email address) and Password (e.g., six characters of either numeric, alpha or alphanumeric) to be used in establishing a secure portal so that the customer 10 may submit and receive information through the website or a personal web page or the like in a secure fashion.

In response to completion of the Getting Started Page, an appropriate "Application Form" (AF) is displayed 202 according to the above choices to continue the process. The consumer 10 then completes and submits the Application Form 202. The Application Form, when completed, includes all factual consumer information derived from the consumer 10 that the system 12 needs to obtain a credit score and ultimately to match the consumer to one or more lenders 18. Examples of information submitted by the consumer 10 at this stage includes loan type, loan amount, credit card accounts, banking accounts and other conventional loan information.

After submitting the consumer application information from the Application Form 202, the consumer 10 may be presented with a "Verification Form" (not shown). The Verification Form permits a review of the consumer application information for accuracy and permits editing of the consumer application information, if necessary. The consumer 10 is presented with a "Consent to the Disclosures and Terms and Agreement" form (not shown). The system may use two disclosures which may be accessed via a line of the Verification Form page, namely, an Electronic Disclosure of Information and a Terms and Agreement. The consumer 10 is permitted to indicate a willingness to consent to these disclosures on the Verification Form Page whereby the initial application process is completed.

When the form is filled out, the consumer submits the initial application information by clicking on a "Submit" feature depicted on the website or any similar method. Browser specific scripting languages validate that the form is valid 204, i.e., are all required fields properly filled in and does the information provided match the type of information required in each type of field. In other words, the system 12 determines if the social security field contains a valid social security number, and so on in a similar fashion. If the form contains no defects 206, the information is submitted to a loan processing server or an equivalent computerized system 12. If the form is not complete, contains invalid information or any other defect, the consumer 10 is prompted by an appropriate warning message and is invited to correct the defects 208.

The loan processing server 12 checks the application information for personal identification information, such as social security number and/or email against previously stored loan applicant profiles 210 to determine if it is a duplicate of a previous submission 212. If the profile contains a match, i.e., one or more of the personal identification data is a duplicate, the system checks the date of the previous submission 214. If the dates are less than a predetermined number of days apart, the consumer 10 is informed that he or she must wait an additional number of days to apply for a loan 216. The number of days may be between about 30 days to one year, depending on a number of factors, such as the amount of the loan and so on. In one embodiment, 30 days is the preferred number of days between loan applications. After informing the consumer of the number of days after which a new application may be submitted, the transaction is ended 218. A customer can submit multiple loan product offerings at any time. For example, a customer can apply for a purchase loan and then apply for a refinance loan without waiting. Once an application is filed for one product, for example a purchase loan, a customer can not resubmit or try a new purchase loan application for a set period, like 30 days.

If the application submittal is not a duplicate submission or profile of a loan consumer 10, the new profile is added into a profile database 220. If the submitted application is a duplicate profile, but more than the predetermined time period, then the existing profile in the profile database is updated with any new information and the time period is reset to zero 222.

After the new or revised profile is added to the loan process database, the application is subjected to an initial filtering process 224. Application of the filter or filters to the data is a known process. Generally, the filtering occurs by the system determining if the consumer meets a first set of loan criteria including a predetermined level of minimal thresholds. An example of a preferred set of minimal thresholds is met by meeting or exceeding one or all of the following criteria:

age—18 years or older—if "Yes" then "Continue"
    state—site operator licensed to do business in this state—if "Yes" then "Continue"
    combined time at current and previous residence greater than 6 months—if "Yes" then "Continue"
    combined time at current and previous job greater than 6 months—if "Yes" then "Continue"
    minimum income greater than $1,000 per month—if "Yes" then "Continue"
    duplicate social security number with in last 30 day—if "Yes" then "Reject"
    duplicate email addresses with in last 30 days—if "Yes" then "Reject"

The system 12 determines if the loan consumer application information/profile passes the initial filtering 226. In the event that the loan consumer application does not meet the minimum criteria, the consumer profile is dated (e.g., a time stamp operation) 228. A message may be e-mailed to the consumer 10 or posted to a secure portion of the site 12, such as a "My Account" section informing the consumer that the process has resulted in a rejection of the application 230. The message may include some indication as to why the applicant 10 has not met the minimum criteria and notified when it would be possible to reapply, for example, in no less than 30 days. Then the process transaction is terminated 232.

If the consumer application information meets or exceeds the minimum criteria then the consumer information from the Application Form is converted into a language for structured information in a format 234, such as XML, accessible and usable by a credit bureau 14 (for example, Trans Union). The XML file is then encrypted and transmitted 236 to the credit bureau 14. In a preferred embodiment, a credit subset of the consumer application information is sent to the credit bureau 14 including the following;
    first name
    middle initial
    last name
    street address
    city
    state
    zip code
    social security number If the credit subset of consumer application information is matched to a credit record, the credit bureau 14 returns via encrypted XML a complete credit report 238 that includes a credit score, also know as a FICO score (which is an acronym for Fair Isaac Credit Organization) and fraud alert report known as a Hawk Alert.

A FICO score is a credit score developed by Fair Isaac & Co. Credit scoring and is a method of determining the likelihood that credit consumers will pay their bills. Scoring has become widely accepted by lenders as a reliable means of credit evaluation. A credit score attempts to condense a borrower's credit history into a single number. Credit scores are calculated by using scoring models and mathematical tables that assign points for different pieces of information which best predict future credit performance. Developing these models involves studying how thousands, even millions, of people have used credit. Score-model developers find predictive factors in the data that have proven to indicate future credit performance. Models can be developed from different sources of data. Credit-bureau models are developed from information in consumer credit-bureau reports.

Credit scores analyze a borrower's credit history considering numerous factors such as, late payments, the amount of time credit has been established, the amount of credit used versus the amount of credit available, the length of time at present residence, the employment history and any negative credit information such as bankruptcies, charge-offs, collections, etc. In practice, there are really three FICO scores computed by data provided by each of the three bureaus—Experian, Trans Union and Equifax. Some lenders use one of these three scores, while other lenders may use the middle score. Presently, the Trans Union FICO score that is preferred is based on the Trans Union scoring model called FICO AUTO 04.

The complete application, credit report, credit score and fraud report is compared to lender specific data criteria prepared by the company via publicly available information, market experience and historical lender loan decision review and analysis 240 based on a standard set of field variables, preferably, but not limited to:

State
Income
Minimum Time on Job
Minimum Time at Residence
FICO Low
FICO High
Minimum Gross Monthly Income
Minimum Loan Amount
Exclude Vehicle Makes
Maximum Vehicle Mileage
Minimum Vehicle Age
Maximum Vehicle Age
Minimum Loan Amount
Minimum Interest Rate
Maximum Debit to Gross Income
Maximum Number if Inquiries
Prior Bankruptcies
Prior Repossessions
Maximum Number of Tradelines
Minimum Number of Tradelines The aforementioned data is analyzed and evaluated 242 to determine all of the lenders 18 that may receive the application, through a system of data tables with imbedded standard but potentially unique data criteria for each lender 18 on the system 12. The consumer application may not meet the minimum criteria set by the system for any lender 18 connected to the system. If no lenders 18 are matched, the application is denied 228, wherein the profile of the consumer 10 is time stamped and the consumer 10 is notified of "No Lenders Found" and/or a "Letter of Adverse Action" is sent via e-mail 230. In the alternate, a message is posted to the web site "My Account" section of the site and the consumer logs-in to retrieve the message. In this particular outcome, the application process is terminated 232 for this consumer 10 and the loan consumer may reapply/resubmit in 30 days, for example.

If one or more lenders 18 are matched, the system 12 determines if five or more lenders are matched 244. In this case, the system 12 selects for further processing only the top four lenders 18 based on CSI score, which are staged for electronic submission. If there are less than five matched lenders 18, the system returns all of the matched lenders.

The one to four selected lenders 18 found to match the applicant criteria are prioritized and ranked 244 by the system 12 based on CSI score. In a preferred embodiment, only these one to four lenders 18 are sent an XML data feed of the consumer and credit information, sequentially transmitted with a delay for credit decision. The rank order of lenders 18 is determined by lenders CSI score (CSI score may use the following to derive a numerical equivalence for every lender in 25 point FICO increments: (application decline rate×application approved decision time+customer survey score/100)). Application Decline Rate is the rate at which a lender may return a negative credit decision. Application Decision Time is the length of time it may take a lender to return a positive credit decision. Customer Survey Score may be a numerical representation of questions asked to customer concerning customer satisfaction information about a lender.

A first lender 18 (the lender with the best match) is sent a first data feed of the applicant information 246. The consumer information is converted into a series of additional XML files 248 depending upon which lenders 18 are selected for submission. The converted consumer information may be referred to as a lender query. Each lender 18 may have unique file structure criteria. Accordingly, this flexibility may be necessary in the event that each lender 18 accepts files in different formats. The system 12 waits a predetermined period of time 250, e.g., 24 hours, for a response from the first lender 18. If there is no response after the predetermined period of time, the system 12, removes the lender 18 from the loan consumer account 252.

The first lender 18 analyzes the information utilizing its own score card, underwriting policies and procedures, and generates a decision. The first lender 18 submits an XML file back to the system server with the decision and decision details.

If the first lender decision is "Declined," the first lender 12 sends to the system server a declined data feed which is processed and stored 254. The consumer 10 is not immediately notified of the declined decision of the first lender 18 by the system 12.

When the system server 12 receives the declined notice and determines 258 if there is a second best matched lender 18. If there is a second best matched lender 18, a data feed 248 is sent to the second best matched lender 18 for analysis and a decision. Preferably, the individual lender polling process 248 is repeated up to four times (Lenders 1, 2, 3, 4). If all decisions are declined a "No Lender Found" email is sent 256 to the customer 10.

If the first lender 18 decision is approved, the first lender return sends by way of XML to the system server 12 approved loan details 254 that preferably include:

Loan is valid until (date, e.g., Nov. 30, 2003)
Select your loan offer (up to amount, e.g., $30,000)
Your approved term (time in months, e.g., 60 months)
Your monthly payment can not exceed (dollar payment amount, e.g., $525.00)
Your minimum loan to value (percentage reflecting the loan balance to the value of a vehicle, e.g., 110%)
Your vehicles maximum mileage (number value of vehicle mileage at time of purchase, e.g., 75,000 miles)
Your model year (age of vehicle parameter, e.g., 1998 or newer)
Your interest rate APR (percentage of interest charged is the loan is selected, e.g., 7.23% APR)

The system 12 notes that an approved decision has been received and notifies 256 the consumer 10 of the approved decision via an email or an equivalent notice. In the alternate, an appropriate message may be posted to the system's web site "My Account" section. The process of polling and reporting the decision may repeat itself up to four times (Lenders 1, 2, 3 and 4) 262. The customer 10 receives an Approval email, or the like, each time an Approval is received, no more than four times. Then, a series of follow-up emails may be sent to the customer 10 over the next 30 days, to drive the customer 10 to the site to alert the customer of the decision and to make the selection.

Via the email link to the site or directly to the site in the "My Account" section the customers 10 are presented with no more than four approved decisions 264. The customer 10 clicks on one or more of the loan decisions received links to review and eventually select 264 the loan that meets their needs.

With the options of no more than four loans from which to select, the consumer 10 is presented with the choice to select the loan that best meets their needs 262. By clicking the green "Get this Loan Now" button, or the like, the customer 10 receives a "Loan Offer Page" outlining the next steps. Additionally, once the customer selects a lender the other Loan Offers—Approved, are finally rejected by deactivation 270 and are not permitted to be accessed 272.

The next steps are often varied and are dependent on the selected lender process. Typically, the lender 18 sends to the customer 10 an email with an acknowledgement, along with loan package via overnight mail and calls the customer to discuss the details of the transaction. It's up to the customer 10 to use the loan by going to a dealership, selecting and purchasing a vehicle, and using the loan.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of matching a loan consumer with Lenders via the Internet comprising:
   a) providing a computer system, wherein the system comprises a web server, a logic-engine, an internally specified filter, and a database;
   b) receiving application information inputted to the computer system by the loan consumer;
   c) storing the application information in the database;
   d) applying the internally specified filter to the application information stored in the database to determine if the loan consumer meets a set of internally specified loan criteria, wherein the internally specified loan criteria includes one or more of publicly available information, historical lender loan decisions, and market experience;
   e) submitting a subset of the application information to a credit bureau;
   f) receiving a credit report based on said submitting of the subset step;
   g) searching a Lender database after said applying the filter step to match the loan consumer application information and credit report to Lenders in the database;
   h) matching, by said computer system, the loan consumer application information to two or more of the Lenders in the database based on said searching step, wherein said matching determines a rank order of the two or more Lenders based on a consumer satisfaction index score;
   i) transmitting a query to a Lender of the two or more Lenders matched from said matching step;
   j) receiving a response from the Lender based on the query;
   k) repeating steps i and j, after said receiving of the response, so as to query any remaining Lenders matched from said matching step;
   l) presenting to the loan consumer only Lenders who responded with an approval from said receiving a response step; and
   m) storing a loan consumer decision based on said presenting step.

2. The method of claim 1, wherein step (b) further comprises:
   validating the application information.

3. The method of claim 2, wherein step (b) further comprises:
   detecting an error; and
   transmitting an error message to the loan consumer.

4. The method of claim 1, wherein step (c) further comprises:
   determining that the application information has been previously received less than a predetermined number of days prior; and
   informing the loan consumer to delay a new submission of application information until after the predetermined number of days is expired.

5. The method of claim 1, wherein step (c) further comprises:
   determining that the application information has not been previously stored; and
   generating a loan consumer profile based on the application information.

6. The method of claim 1, wherein step (c) further comprises:
   determining that the application information has been previously stored more than a predetermined number of days prior; and
   updating a corresponding previously generated loan consumer profile.

7. The method of claim 1, wherein step (l) includes sending only a predetermined number of Lender responses.

8. The method of claim 7, wherein the predetermined number of Lender responses is four or less than four responses.

* * * * *